United States Patent [19]

Greber et al.

[11] 3,948,835
[45] Apr. 6, 1976

[54] SILICON-MODIFIED PREPOLYMERS

[75] Inventors: Gerd Greber, Binningen; Roland Darms, Therwil; Dieter Lohmann, Pratteln, all of Switzerland

[73] Assignee: Ciba-Geigy Corporation, Ardsley, N.Y.

[22] Filed: May 24, 1974

[21] Appl. No.: 473,048

[30] Foreign Application Priority Data
June 7, 1973 Switzerland.......................... 8258/73
Aug. 2, 1973 Switzerland....................... 11229/73

[52] U.S. Cl.......... 260/2 S; 260/46.5 E; 260/78 TF; 260/78 SC
[51] Int. Cl.$^2$ .................. C08G 77/00; C08G 73/00
[58] Field of Search ....... 260/78 TF, 47 CP, 46.5 E, 260/2 S

[56] References Cited
UNITED STATES PATENTS

| | | | |
|---|---|---|---|
| 3,288,754 | 11/1966 | Green | 260/47 |
| 3,779,990 | 12/1973 | Greber et al. | 260/47 CP |

*Primary Examiner*—Lewis T. Jacobs
*Attorney, Agent, or Firm*—Luther A. R. Hall

[57] ABSTRACT

New silicon-modified polyamide, polyamide-acid and polyamide-amide-acid prepolymers are described, which can be manufactured, for example, by reaction of aminosilanes with suitable polyamides, polyamide-acids or polyamide-amide-acids. These prepolymers are suitable for the manufacture or cross-linked polymers containing siloxane groups, which possess good mechanical, electrical and thermal properties.

15 Claims, No Drawings

SILICON-MODIFIED PREPOLYMERS

The present invention relates to new silicon-modified polyamide, polyamide-acid and polyamide-amide-acid prepolymers and their cyclised derivatives, processes for the manufacture of these prepolymers and their use for the manufacture of industrial products.

New silicon-modified polyamide, polyamide-acid and polyamide-amide-acid prepolymers with an inherent viscosity of 0.04 to 4.0, have been found, which have the formula I

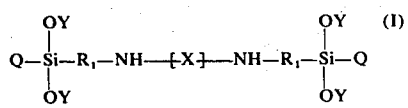

wherein X represents a structural element of the formula II

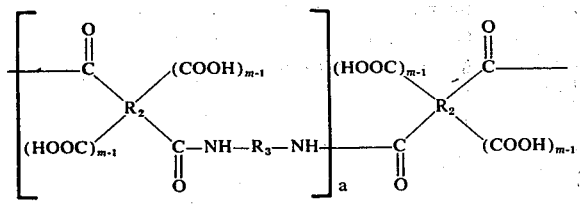

$a$ denotes a number from 0 to 100, especially 0 to 60, and the individual $m$, $R_1$, $R_2$, $R_3$, $Q$ and $Y$ independently of one another denote the following: $m$ denotes the number 1 or 2, $R_1$ denotes a radical

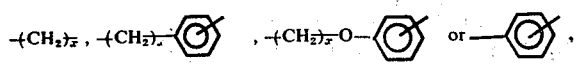

with $x$ denoting a number from 1 to 4, $R_2$ denotes a carbocylic - aromatic or heterocyclic radical, wherein the carbonamide and carboxyl groups are bonded to different ring carbon atoms and the carboxyl groups are each in the orthoposition to a carbonamide group, $R_3$ denotes an aliphatic radical with at least 2 carbon atoms, or a cycloaliphatic, araliphatic, carbocylic-aromatic or heterocyclic radical, Q denotes methyl, phenyl or a —OY radical, with Y having the meaning indicated below, and Y denotes an alkyl radical with 1 to 6 carbon atoms or a phenyl radical, and the corresponding cyclised derivatives.

Silicon-modified polyamide, polyamide-acid and polyamide-amide-acid prepolymers according to the invention preferably have an inherent viscosity of 0.07 to 2.5.

The inherent viscosity $\eta_{inh}$ is calculated from the following equation:

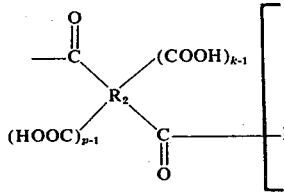

In this equation the symbols have the following meaning: $\ln$ = natural logarithm, $\eta$ = viscosity of the solution (0.5% by weight of the polymer in a suitable solvent, for example N,N-dimethylacetamide, N,N-dimethylformamide or N-methylpyrrolidone), $\eta_o$ = viscosity of the solvent and $c$ = concentration of the polymer solution in g of polymer/100 ml of solvent.

The viscosity measurements are carried out at 25°C. As is generally known, the inherent viscosity represents a measure of the molecular weight of a polymer. The quoted values of $\eta_{inh}$ = 0.04 to 4.0 correspond to average molecular weights of about 400 to 50,000. The average molecular weights can be determined by methods which are in themselves known, for example by means of light scattering.

Prepolymers according to the definition, with structural elements X of the formula II, wherein $a \geq 1$ and the individual $m$, $R_2$ and/or $R_3$ can have different meanings, can be homopolymers or copolymers with a statistical distribution or with any desired at least partially block-like arrangement of polyamide, polyamide-acid and/or polyamide-amide-acid units, according to the invention, in the structural element X, and can be, for example, homopolymers or block copolymers with terminal acid groups.

Thus, prepolymers of the formula I inter alia also comprise prepolymers wherein the structural element X can be represented by the formula IIa

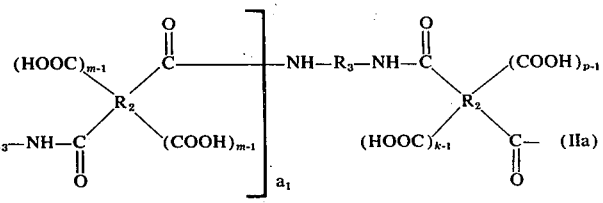

wherein $a_1$ denotes a number from 0 to 99 and $k$ and $p$ independently of one another denote the number 1 or 2 and what has been stated under the formula I applies to $R_1$, $R_2$, $R_3$, $m$, Q and Y, and the corresponding cyclised derivatives.

Silicon-modified prepolymers of the formula I which accord with the definition and wherein X represents a structural element of the formula II, and corresponding cyclised derivatives, can be manufactured by reacting, if $a = 0$, dicarboxylic acid dichlorides of the formula

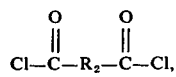

tricarboxylic acid anhydride chlorides of the formula

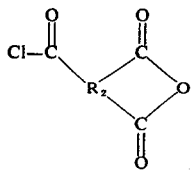

or tetracarboxylic acid dianhydrides of the formula

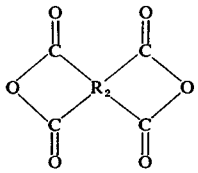

or, if $a \geq 1$, polyamides of polaymide-amide-acids with 2 acid chloride end groups, polyamide-acids or polyamide-amide-acids with 2 anhydride end groups or polyamide-amide-acids with one acid chloride and one anhdyride end group, all these-apart from said end groups-corresponding to the formula II, or corresponding cyclised derivatives with at least 2 mols of an aminosilane of the formula III

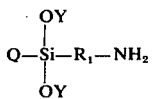 (III)

wherein what has been stated under the formula I applies to $a, m, R_1, R_2, R_3, Q$ and $Y$, and optionally subsequently chemically cyclising silicon-modified polyamide-acid or polyamide-amide-acid prepolymers.

According to a modified process, silicon-modified prepolymers of the formula I, according to the definition, wherein X represents a structural element of the formula IIa and $k = 2$, can also be obtained by reacting at least 2 mols of a compound of the formula IV

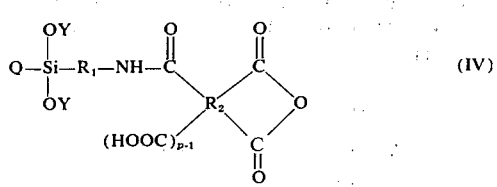 (IV)

wherein $p$ is the number 1 or 2, the radical —COOH is in the ortho-position to the grouping —CO-NH-$R_1$— and the anhydride grouping is bonded to adjoining C atoms of the radical $R_2$, with a diamine of the formula $H_2N-R_3-NH_2$, if $a_1 = 0$, or a polyamide, a polyamide-acid or a polyamide-amide-acid, if $a_1 \geq = 1$, of the formula V

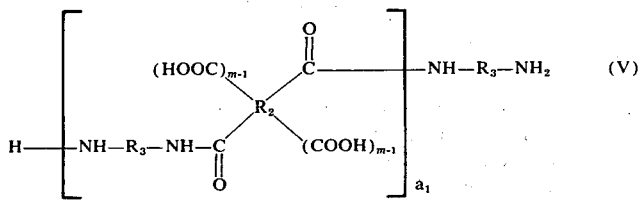 (V)

or corresponding cyclised derivatives, with the statements under formula I or IIa applying to $a_1, m, p, R_1, R_2, R_3, Q$ and $Y$, and optionally subsequently chemically cyclising silicon-modified polyamide-acid or polyamide-amide-acid prepolymers.

If $R_2$ represents a carbocyclic-aromatic radical, the latter preferably has at least one 6-membered ring; in particular, these are monocyclic radicals, fused polycyclic radicals or polycyclic radicals with several cyclic, fused or non-fused systems, which can be linked to one another direct or via bridge members.

As examples of suitable bridge members there may be mentioned:

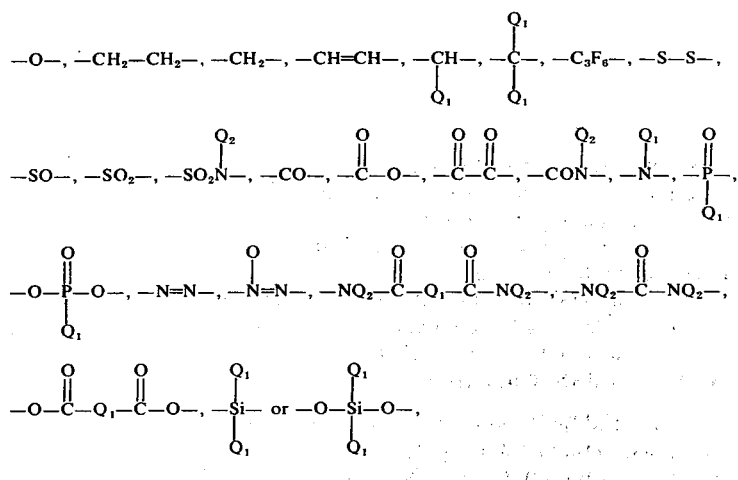

wherein $Q_1$ represents an alkyl or alkylene radical with 1 to 6, preferably 1 to 4, carbon atoms, which can optionally be substituted by halogen atoms, preferably fluorine, or a cycloalkyl, aryl or arylene radical and $Q_2$ represents hydrogen, an alkyl radical with 1 to 4 carbon atoms, which can optionally be substituted by halogen atoms, a cycloalkyl radical or an aryl radical. Such radicals can also be bonded to one another via two bridge members, such as two —$SO_2$— groups.

If $R_2$ denotes a heterocyclic radical, it can in particular be a 5-membered or 6-membered heterocyclic-aromatic, optionally benzo-condensed ring system containing O, N and/or S.

Carbocyclic-aromatic or heterocyclic radicals represented by $R_2$ can also be substituted, for example by nitro groups, alkyl groups with 1 to 4 carbon atoms, trifluoromethyl groups, halogen atoms, especially fluorine, silyl groups or sulphamoyl groups.

Radicals represented by $R_3$ can be unsubstituted or substituted, for example by halogen atoms, such as fluorine, chlorine or bromine, or by alkyl or alkoxy groups each with 1 to 4 carbon atoms.

If $R_3$ represents a carbocyclic-aromatic radical, it is preferably a monocyclic, fused polycyclic or non-fused bicyclic aromatic radical, and in the latter case the aromatic nuclei are bonded to one another via a bridge member. Possible bridge members are the groups mentioned previously when discussing $R_2$. If $R_3$ denotes a heterocyclic radical, it is in particular a heterocyclic-aromatic 5-membered or 6-membered ring containing O, N and/or S.

Possible aliphatic radicals $R_3$ are above all alkylene radicals with 2 to 12 carbon atoms, and the alkylene chain can also be interrupted by hetero-atoms, such as O, S or N atoms.

If $R_3$ denotes a cycloaliphatic radical it represents, for example, the cyclohexyl or dicyclohexylmethane radical, whilst possible araliphatic radicals are above all, 1,3-, 1,4- or 2,4-bis-alkylenebenzene, 4,4'-bis-alkylene-diphenyl and 4,4'-bis-alkylene-diphenyl-ether radicals.

Preferably, the individual $R_2$ independently of one another represent an unsubstituted monocyclic, fused polycyclic or non-fused bicyclic aromatic radical, the aromatic nuclei in the latter case being bonded to one another via the bridge member —O— or —CO—, whilst the individual $R_3$ preferably independently of one another denote a monocyclic or non-fused bicyclic aromatic radical which is optionally substituted by halogen atoms or alkyl or alkoxy groups with 1 to 4 carbon atoms each, an unsubstited monocyclic araliphatic radical or an unsubstituted aliphatic radical possessing 2 to 10 carbon atoms.

Particularly preferentially, $R_2$ represents the 1,4- or 1,3-phenylene radical or a benzene ring or the benzophenone ring system and $R_3$ represents the 1,4- or 1,3-phenylene radical, the 4,4'-diphenylyl-ether radical or the 4,4'-diphenylylmethane radical, but of $R_2$ and $R_3$ only one denotes a 1,4-phenylene radical.

The following may be mentioned as examples of alkyl radicals with 1 to 6 carbon atoms which Y represents: methyl, ethyl, n-propyl, iso-propyl, n-butyl, tert.-butyl, n-pentyl and n-hexyl radicals. Preferably, the individual Y represent an ethyl or propyl radical, especially the n-propyl radical, whist Q, if Y = ethyl, preferably denotes the ethoxy group and, if Y = propyl, denotes the methyl group.

In general, if a or $a_1 \geq 1$, prepolymers of the formula I with structural elements of the formula II or IIa, wherein the individual $R_2$ and $R_3$ have the same meaning, k, m and p are the same for each radical $R_2$, and what has been stated under the formula I applies to $R_1$, Q and Y, and the corresponding cyclised derivatives, are preferred.

Further preferred compounds are prepolymers of the formula I wherein X represents a structural element of the formula IIb

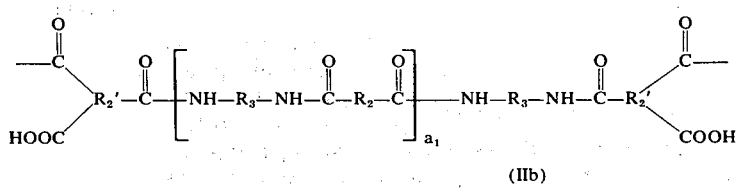

(IIb)

in which $a_1$ denotes a number from 1 to 99 and the two $R_2'$ each represent a benzene ring, with the carbonamide and carboxyl groups being bonded to different ring carbon atoms and the carboxyl groups each being in the ortho-position to the —CO-NH-$R_1$— grouping, and the individual $R_1$, $R_2$, $R_3$, Q and Y are identical, and the corresponding derivatives with cyclised terminal carboxylic acid groups, and prepolymers of the formula I, wherein X represents a structural element of the formula IIc

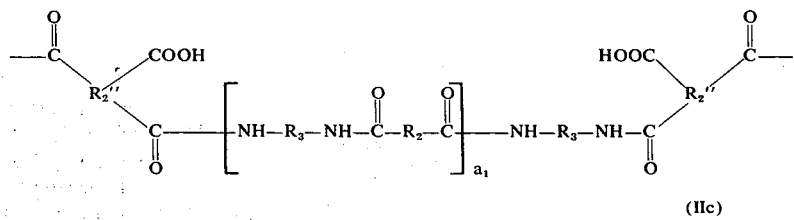

(IIc)

in which $a_1$ denotes a number from 1 to 99 and the two $R_2''$ each denote a benzene ring, with the carbonamide groups and carboxyl groups being bonded to different ring carbon atoms and the carboxyl groups being each in the ortho-position to the —CO-NH-$R_3$— grouping, and the individual $R_1$, $R_2$, $R_3$, Q and Y are identical, as well as the corresponding derivatives with cyclised terminal carboxylic acid groups.

The following silicon-modified prepolymers are particularly preferred:

Prepolymers of the formula I, wherein X represents a structural element of the formula II with $m$ in each case = 1, or denotes a structural element of the formula IIb, $R_1$ in each case denotes a

radical, the individual $R_2$ and $R_3$ are respectively identical and one of $R_2$ and $R_3$ represents the 1,4-phenylene radical and the other the 1,3-phenylene radical or $R_2$ and $R_3$ each represent the 1,3-phenylene radical, Q represents the methyl group and Y represents a propyl group, or Q represents the ethoxy group and Y the ethyl group, and what has been stated under the formula II or IIb applies to $a$, $a_1$ and $R_2'$, as well as the corresponding derivatives with cyclised terminal carboxylic acid groups;

prepolymers of the formula I, wherein X denotes a structural element of the formula II with $m = 2$ in each case, $R_1$ in each case represents a

radical, $R_2$ in each case denotes a benzene ring or the benzophenone ring system, $R_3$ in each case denotes the 4,4'-diphenylyl-ether or the 4,4'-diphenylylmethane radical, Q denotes the methyl group and Y denotes a propyl group or Q denotes the ethoxy group and Y the ethyl group and has the indicated meaning, as well as the corresponding cyclised derivatives;

prepolymers of the fomula I, wherein X represents a structural element of the formula IId

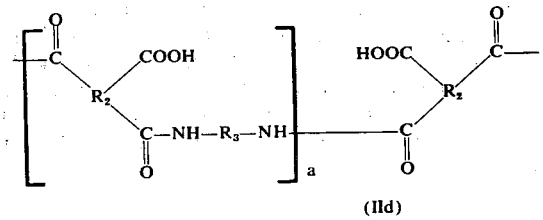

(IId)

in which $R_1$ in each case represents a

radical, $R_2$ in each case represents a benzene ring and $R_3$ in each case represents the 4,4'-diphenylylether or the 4,4'-diphenylylmethane radical, Q denotes the methyl group and Y denotes a propyl group or Q denotes the ethoxy group and Y denotes the ethyl group and $a$ has the indicated meaning, as well as the corresponding cyclised derivatives; and prepolymers of the formula I, wherein X represents a structural element of the formula IIc, $R_1$ in each case represents a

radical, the individual $R_2$ and $R_3$ are respectively identical and one of $R_2$ and $R_3$ denotes the 1,4-phenylene radical and the other the 1,3-phenylene radical or $R_2$ and $R_3$ each denote the 1,3-phenylene radical, Q denotes the methyl group and Y denotes a propyl group or Q denotes the ethoxy group and Y the ethyl group and $a_1$ and $R_2''$ have the indicated meaning, as well as the corresponding derivatives with cyclised terminal carboxylic acid groups.

The starting products which can be used according to the invention are in themselves known or can be manufactured according to processes which are in themselves known.

Examples of dicarboxylic acid dichlorides of the formula

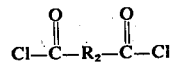

which can be used are thiophene-2,5-dicarboxylic acid dichloride and terephthalic acid dichloride, but above all isophthalic acid dichloride.

As a tricarboxylic acid anhydride-chloride of the formula

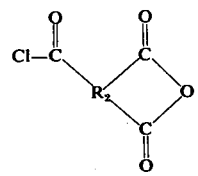

it is in particular possible to use trimellitic acid 1,2-anhydride-chloride (1,3-dioxo-benzo[c]oxalane-5-carboxylic acid chloride).

Examples of tetracarboxylic acid dianhydrides of the formula

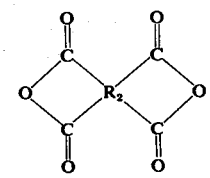

which can be used are pyromellitic acid dianhydride, 3,3', 4,4'-benzophenone-tetracarboxylic acid dianhydride, 2,3,3',4'-benzophenone-tetracarboxylic acid dianhydride, 2,2', 3,3'-benzophenone-tetracarboxylic acid dianhydride, 3,3',4,4'-diphenyltetracarboxylic acid dianhydride, 2,2',3,3'-diphenyl-tetracarboxylic acid dianhydride, bis-(2,3-dicarboxyphenyl)-methane dianhydride, bis-(3,4-dicarboxyphenyl)-methane dianhydride, 2,2-bis-(2,3-dicarboxyphenyl)-propane dianhydride, bis-(3,4-dicarboxyphenyl)-ether dianhydride, bis-(3,4-dicarboxyphenyl)-sulphone dianhydride, N,N-(3,4-dicarboxyphenyl)-N-methylamine dianhydride, 3,3',4,4'-tetracarboxybenzoyloxybenzene dianhydride, 2,3,6,7-napthalene-tetracarboxylic acid dianhydride, 1,2,5,6-naphthalene-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride.

Instead of the abovementioned dianhydrides it is also possible to employ corresponding tetracarboxylic acid diesterdihalides, tetracarboxylic and diester-diamides, tetracarboxylic acid diamide-dihalides, tetracarboxylic acid diesters or tetracarboxylic acid tetraesters.

Polyamides or polyamide-amide-acids with 2 acid chloride end groups, polyamide-acids or polyamide-amide-acids with 2 anhydride end groups or polyamide-amide-acids with one acid chloride end group and one anhydride end group ($a \geq 1$), which apart from said end groups-correspond to the formula II, can be manufactured by reacting an excess of suitable carboxylic acid derivatives, that is to say dicarboxylic acid dichlorides, tricarboxylic acid anhydridechlorides or tetracarboxylic acid dianhydrides of the above-mentioned formulae with one or more diamines of the formula $H_2N-R_3-NH_2$. IF at the same time different carboxylic acid derivatives are employed, in a total excess over the diamine, copolymers corresponding to the formula II are obtained which have identical or different terminal acid groups and a statistical distribution of the polyamide, polyamide-acid and/or polyamide-amide-acid units. If, on the other hand, a single carboxylic acid derivative is used, in excess over the diamine, homopolymers with terminal acid groups are obtained, in which the terminal acid groups can, when using a tricarboxylic acid anhydride-chloride, also be different, depending on the type of linking.

Instead of tricarboxylic acid anhydride-chlorides it is also possible, in the case of $a \geq 2$, to employ tricarboxylic acid derivaties of the formula

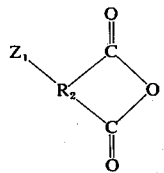

wherein $Z_1$ denotes a —COO-alkyl radical with 1–5 carbon atoms in the alkyl group, a —COO-aryl or —COOH radical and the corresponding salts, such as alkali metal salts or ammonium salts or salts with tertiary bases. As examples there may be mentioned: trimellitic acid anhydride, the Na salt of trimellitic acid anhydride, the ammonium salt of trimellitic acid anhydride, trimellitic acid anhydride monomethyl, monoethyl, monoisopropyl, mono-sec.-butyl or mono-tert.-butyl and monoisopentyl ester and trimellitic acid anhdyride benzoic acid ester.

In these cases, a prepolymer possessing amino end groups is first prepared by reaction of a tricarboxylic acid derivative of this type with an excess of a diamine according to the definition, after which the prepolymer is allowed to react with at least 2 mols of a dicarboxylic acid dichloride, tricarboxylic acid anhydride-chloride or tetracarboxylic acid dianhydride.

Polymers corresponding to the formula II$b$ and having terminal acid groups can be manufactured analogously by allowing a homopolymer, copolymer or block copolymer possessing amino end groups, for example a polyamide homopolymer, to react with at least 2 mols of another carboxylic acid derivative, for example a tricarboxylic acid anhydride-chloride, such as trimellitic acid 1,2-anhydride-chloride.

Block copolymers with terminal acid groups can be obtained by reacting an excess of one or more copolyers or homopolymers with terminal acid groups, prepared in the manner described above, with homopolymers or copolymers possessing amino end groups.

Finally, starting products corresponding to the formula II, having terminal acid groups and a partially block-like arrangement of polyamide, polyamide-acid and/or polyamide-amide-acid units, can be prepared, for example, by reacting an excess of a homopolymer possessing terminal acid groups with a diamine according to the definition.

Polymers of the formula V possessing amino end groups can be manufactured analogously by employing the diamine or diamines or the polymers with terminal amino groups in excess over the carboxylic acid derivatives or the polymers possessing terminal acid groups.

Polyamide-acid or polyamide-amide-acid polymers thus obtained can, if desired, be cyclised thermally or chemically, by methods which are in themselves known, before the reaction with the aminosilanes of the formula III or the compounds of the formula IV.

Preferred dicarboxylic acid derivatives, tricarboxylic acid derivatives or tetracarboxylic acid derivatives for the above reactions are isophthalic acid dichloride, trimellitic acid anhydride, trimellitic acid 1,2-anhydride-chloride, pyromellitic acid dianhydride and benzophenonetetracarboxylic acid dianhydride.

Compounds which are in themselves known can be used as the diamines of the formula $H_2N-R_3-NH_2$.

The following may be mentioned as specific examples of carbocyclic-aromatic diamines: o-, m- and p-phenylenediamine, diaminotoluenes, such as 2,4-diaminotoluene, 1,4-diamoni-2-methoxybenzene, 2,5-diaminoxylene, 1,3-diamino-4-chlorobenzene, 1,4-diamino-2,5-dichlorobenzene, 1,4-diamino-2-bromobenzene, 1,3-diamino-4-isopropylbenzene, N,N'-diphenyl-1,4-phenylenediamine, 4,4'-diaminodiphenyl-2,2-propane, 4,4'-diaminodiphenylmethane, 2,2'- or 4,4'-diaminostilbene, 4,4'-diaminodiphenyl-ether, 4,4'-diaminodiphenyl-thioether, 4,4'-diaminodiphenyl-sulphone, 3,3'-diaminodiphenylsulphone, 4,4'-diaminobenzoic acid phenyl ester, 2,2'- or 4,4'-diaminobenzophenone, 4,4'-diaminobenzil, 4-(4'-aminophenylcarbamoyl)-aniline, bis-(4-aminophenyl)-phosphine oxide, bis-(4-aminophenyl)-methylphosphine oxide, bis-(3-aminophenyl)-methylphosphine oxide, bis-(4-aminophenyl)-phenylphosphine oxide, bis-(4-aminophenyl)-cyclohexylphosphine oxide, N,N-bis-(4-aminophenyl)-N-phenylamine, N,N-bis-(4-aminophenyl)-N-methylamine, 4,4'-diaminodiphenylurea, 1,8- or 1,5-diaminonaphthalene, 1,5-diaminoanthraquinone, diaminofluoranthene, bis-(4-aminophenyl)-diethylsilane, bis-(4-aminophenyl)-dimethylsilane and bis-(4-aminophenyl)-tetramethyl-disiloxane.

Particularly preferred compounds are 1,4- and above all 1,3-phenylenediamine, 4,4'-diaminodiphenyl ether and 4,4'-diaminodiphenyl-methane.

Examples of heterocyclic diamines are: 2,6-diaminopyridine, 2,4-diaminopyrimidine, 2,4-diamino-s-triazone, 2,7-diamino-dibenzofurane, 2,7-diaminocarbazole, 3,7-diaminophenothiazine and 2,5-diamino-1,3,4-thiadiazole.

As aliphatic diamines there may be mentioned: dimethylenediamine, trimethylenediamine, tetramethylenediamine, hexamethylenediamine, heptamethylenediamine, octamethylenediamine, nonamethylenediamine and decamethylenediamine, 2,2-dimethylpropylenediamine, 2,5-dimethylhexamethylenediamine, 2,5-dimethylheptamethylenediamine, 4,4-dimethylheptamethylenediamine, 3-methylheptamethylenediamine, 3-methoxyhexamethylenediamine, 5-methylnonamethylenediamine, 2,11-diaminododecane, 1,12-diaminooctadecane, 1,2-bis-(3-aminopropoxy)-ethane, N,N'-dimethylethylenediamine, N,N'-diethyl-1,3-diaminopropane and N,N'-dimethyl-1,6-diaminohexane as well as the diamines of the formulae $H_2N(CH_2)_3O(CH_2)_2O(CH_2)_3NH_2$ and $H_2N(CH_2)_3S(CH_2)_3NH_2$.

Finally, 1,4-diaminocyclohexane and 4,4'-diaminodicyclohexylmethane may be mentioned as suitable cycloaliphatic diamines and 1,4-bis-(2-methyl-4-aminopentyl)-benzene, 1,4-bis-(1,1-dimethyl-5-aminopentyl)-benzene and 1,3- or 1,4-bis-(aminomethyl)-benzene may be mentioned as suitable araliphatic diamines.

The condensation reactions described are carried out in a manner which is in itself known, preferably in an anhydrous organic solvent, for example N,N-dialkylamides of monocarboxylic acids with 1–4 carbon atoms, such as N,N-dimethylacetamide and N,N-dimethylformamide; N-methyl-2-pyrrolidone, N,N,N',N'-tetramethylurea, tetrahydrofurane, cyclohexanone, hexamethylphosphoric acid triamide (Hexametapol), tetrahydrothiophen dioxide (sulpholane) or dimethylsulphoxide. Depending on the nature of the reactants, the reaction temperatures are between about —20°C and +250°C.

The aminosilanes of the formula VI, according to the definition, are also known in themselves or can be manufactured according to known methods.

The following may be mentioned as examples of suitable aminosilanes of the formula VI: aminomethyl-di-n-propoxymethylsilane, (β-aminoethyl)-di-n-propoxy-methylsilane, (β-aminoethyl)-diethoxyphenylsilane, (β-aminoethyl)-tri-n-propoxysilane, (β-aminoethyl)-dimethoxy-methylsilane, (γ-aminopropyl)-di-n-propoxy-methylsilane, (γ-aminopropyl)-di-n-butoxy-methylsilane, (γ-aminopropyl)-trimethoxysilane, (γ-aminopropyl)-triethoxysilane, (γ-aminopropyl)-di-n-pentoxy-phenylsilane, (γ-aminopropyl)-methoxy-n-propoxy-methylsilane, (ε-aminobutyl)-dimethoxy-methylsilane, (3-aminophenyl)-di-n-propoxy-methylsilane, (4-aminophenyl)-tri-n-Proboxysilane, [β-(4-amino-phenyl)-ethyl]-diethoxy-methylsilane, [β-(3-aminophenyl)-ethyl]-di-n-propoxy-phenylsilane, [γ-(4-aminophenyl)-propyl]-di-n-propoxy-methylsilane, [γ-(4-aminophenoxy)-propyl]-di-n-propoxymethylsilane and [γ-(3-aminophenoxy)-propyl]-di-n-butoxymethylsilane. (γ-Aminopropyl)-triethoxysilane and [γ-(4-aminophenyl)-propyl]-di-n-propoxy-methylsilane, but very particularly (γ-aminopropyl)-di-n-propoxy-methylsilane and [γ-(4-aminophenoxy)-propyl]-di-n-propoxy-methylsilane, are preferred.

The compounds of the formula IV are new; they can be manufactured in what is in itself a conventional manner by reaction of aminosilanes of the formula III with a tricarboxylic acid anhydride-chloride or tetracarboxylic acid dianhydride of the formula

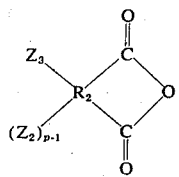

wherein $R_2$ has the meaning indicated under the formula I, $p$ is the number 1 or 2, $Z_3$ together with $Z_2$, if $p = 2$, forms an anhydride group

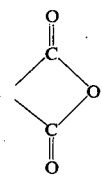

or $Z_3$, if $p = 1$, represents the —COCl radical, with $Z_2$ and $Z_3$ being in the ortho-position to one another and the anhydride group being bonded to adjacent carbon atoms of the radical $R_2$, such as pyromellitic acid dianhydride and benzophenonetetracarboxylic acid dianhydride, but above all trimellitic acid 1,2-anhydride-chloride. The reaction is preferably carried out in an anhydrous organic solvent, such as chlorinated aliphatic hydrocarbons, for example dichloroethane, methylene chloride or perchloroethylene, and in the presence of an acid-binding agent, such as triethylamine, at temperatures of about —40°C to +30°C. After completion of the reaction, and after filtering off the hydrochloride which has precipitated, the compounds of the formula IV can be purified by recrystallisation from a suitable solvent, such as benzene.

Examples of suitable compounds of the formula IV are: trimellitic acid 1,2-anhydride-β-(trimethoxysilyl)-ethylamide, trimellitic acid 1,2-anhydride-γ-(di-n-propoxy-methylsily)-propylamide, trimellitic acid 1,2-anhydride-γ-(tri-n-propoxysilyl)-propylamide, trimellitic acid 1,2-anhydride-4'-[γ-(di-n-propoxy-methylsilyl)-propoxy]-anilide, trimellitic acid 1,2-anhydride-4'-[γ-(di-n-propoxy-methylsilyl)-propyl]-anilide, trimellitic acid 1,2-anhydride-3'-(diethoxy-methylsilyl)-anilide, pyromellitic acid 1,2-anhydride-4-[β-(trimethoxysilyl)-ethylamide], pyromellitic acid 1,2-anhydride-4-[γ-(di-n-propoxymethylsilyl)-propylamide] and benzophenonetetracarboxylic acid 3,4-anhydride-4'-[γ-(triethoxysilyl)-propylamide].

The reaction of the starting products according to the definition, with at least 2 mols of an aminosilane of the formula III or of a compound of the formula IV, can be carried out in a manner which is in itself known, preferably in an anhydrous organic solvent at temperatures between about —20°C and +50°C, especially about —15°C to +25°C. Suitable organic solvents are: N,N-dimethylacetamide, N,N-diethylacetamide, N,N-dimethylformamide, N,N-dimethylmethoxyacetamide, N-methyl-2-pyrrolidone, N-acetyl-2-pyrrolidone, N-methyl-ε-caprolactum, hexamethylphosphoric acid triamide (Hexametapol), N,N,N',N'-tetramethylurea, tetrahydrofurane, cyclohexanone, tetrahydrothiophene dioxide (sulpholane) and dimethylsulphoxide.

The reaction can also be carried out in mixtures of such solvents. On the other hand it is also possible to dilute these preferred solvent systems with other organic aprotic solvents, such as aromatic, cycloaliphatic or aliphatic optionally chlorinated hydrocarbons, for example benzene, toluene, xylenes, cyclohexane, pentane, hexane, petroleum ether and methylene chloride or dioxane.

If the aminosilanes of the formula III and/or the compounds of the formula IV are reacted with polymers according to the definition, the latter are suitably employed in the form of their solutions as obtained when the polymers are manufactured.

In the reaction with aminosilanes of the formula III or compounds of the formula IV, preferably at least 2 mols of the same aminosilane of the formula III or the same compound of the formula IV are used. However, to manufacture asymmetrical prepolymers of the formula I it is also possible to employ mixtures of the said compounds in corresponding molar amounts or to carry out the reaction stepwise with in each case at least one mol of a different aminosilane of the formula III or of a different compound of the formula IV.

In all these cases, the aminosilane or the compound of the formula IV is preferably employed in the stoichiometric amount.

After completion of the reaction the solvents can, if desired, be removed in the usual manner, for example by distilling them off, if necessary under reduced pressure.

The cyclisation of prepolymers according to the invention, of the polyamide-acid or polyamide-amide-acid category, to give the corresponding polyimides or polyamide-imides, by a chemical method, is also carried out in a manner which is in itself known, for example by gentle treatment with a dehydrating agent, used by itself or mixed with a tertiary amine; examples of agents which can be used are acetic anhydride, propionic anhydride and dicyclohexylcarbodiimide or a mixture of acetic anhydride and triethylamine or pyridine. To avoid crosslinking reactions, this process should be carried out at temperatures which are as low as possible, preferably at a temperature below 50°C and in particular between about −20°C and +25°C.

The silicon-modified prepolymers according to the invention can be used for the manufacture of industrial products, such as fibres, thin and thick films, coating compositions, foams, laminating resins, laminates, compression moulding powders, pressings and the like, in a manner which is in itself known, entailing heating to temperatures between about 50° and 350°C and, if desired, with the use of customary additives, such as pigments, fillers and the like. The crosslinked polymers, containing siloxane groups, which are produced thereby are insoluble in organic solvents. They are distinguished by good mechanical, electrical and thermal properties, especially improved heat stability and good mechanical properties at low temperatures. Non-cyclised prepolymers with $a$ or $a_1 < 10$ and above all with $a$ or $a_1 < 5$ are above all distinguished by their porcessability, in that they can in general be processed evan at temperatures as low as about 160°C, in a manner which is in itself known, to give industrial products, above all laminates, foams or compression mouldings.

EXAMPLE 1

13.553 g (0.0666 mol) of isophthalic acid dichloride are dissolved in 100 ml of anhydrous N,N-dimethylacetamide (DMA) at −15°C under nitrogen in a 750 ml sulphonation flask which is equipped with a stirrer, internal thermometer, dropping funnel and gas inlet tube. 3.6047 g (0.0333 mol) of m-phenylenediamine in solid form are introduced into this solution at −10° to −15°C, whilst cooling. After the exothermic reaction has subsided, the mixture is stirred for a further 2 hours at 0–5°C and a solution of 6.746 g (0.0666 mol) of triethylamine in 50 ml of anhydrous DMA is then added dropwise at the same temperature. After stirring for one hour at 0°–5°C, a solution of 14.6266 g (0.0666 mol) of (γ-aminopropyl)-di-n-propoxymethylsilane and 6.746 g (0.0666 mol) of triethylamine in 50 ml of anhydrous DMA is added dropwise to the suspension obtained. The reaction mixture is then stirred for 2 hours at room temperature (20°–25°C) and the triethylamine hydrochloride which has precipitated is filtered off through a glass frit and rinsed 3 times with a total of 80 ml of anhydrous DMA. A slightly viscous solution of a polyamide prepolymer with terminal methyl-di-n-propoxysilyl groups and an average molecular weight ($\overline{M}$) of approx. 800 is obtained; $\eta_{inh}$. 0.07 dl/g (0.5% in DMA at 25°C).

EXAMPLE 2

Following the procedure described in Example 1, 4.866 g (0.045 mol) of m-phenylenediamine in anhydrous DMA, with the addition of 8.096 g (0.08 mol) of triethylamine, are reacted with 8.121 g (0.04 mol) of isophthalic acid dichloride. A solution of polyamide block with terminal amino groups and an average molecular weight of approx. 2,000 is obtained. This solution is added dropwise over the course of 15 minutes, at 20°–25°C, to a solution of 4.856 g (0.01 mol) of trimellitic acid 1,2-anhydride-4′-[γ-di-n-propoxy-methylsilyl)-propoxy] anilide of the formula

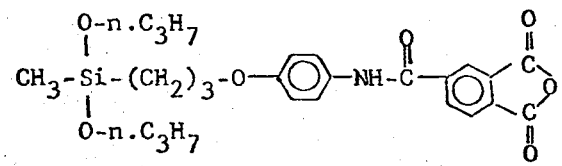

A solution of a polyamide prepolymer with terminal methyl di-n-propoxysilyl groups and an average molecular weight of approx. 3,000 results; $\eta_{inh}$. 0.19 dl/g (0.5% in DMA at 25°C). This solution can be converted into films, coatings or laminates in accordance with known methods.

The trimellitic acid 1,2-anhydride-4′-[γ-(di-n-propoxymethylsilyl)-propoxy]-anilide used in the above example can be prepared as follows:

50 ml of dichloroethane are initially introduced into a 1.5 l sulphonation flask which is equipped with a stirrer, internal thermometer, reflux condensor, 2 dropping funnels with pressure equilibration, and a nitrogen inlet, and are cooled to −30° to −40°C. 21.0 g (0.1 mol) of trimellitic acid 1,2-anhydride-chloride in 250 ml of dichloroethane and 31.1 g (0.1 mol) of [γ-(4-aminophenoxy)-propyl]-di-n-propoxy-methylsilane and 10.1 g of triethylamine in 250 ml of dichloroethane are then simultaneously added dropwise at −30°C over the course of 1 hour and 20 minutes. The reaction mixture is stirred for approx. 4 hours at −30°C, after which it is allowed to warm to room temperature. The triethylamine hydrochloride which has precipitated is filtered off under nitrogen and the filtrate is evaporated to dryness in vacuo, with exclusion of moisture. The resulting yellow crystalline powder is recrystallised 3–4 times from benzene, with exclusion of moisture, to remove residual triethylamine hydrochloride. Yield 38 g (76% of theory).

EXAMPLE 3

Analogously to the procedure described in Example 1, 10.814 g (0.1 mol) of m-phenylenediamine are dissolved in 100 ml of anhydrous DMA. 16.264 g (0.08 mol) of isophthalic acid dichloride in solid form are introduced into the resulting solution at −20°C, whilst cooling. The reaction mixture is then stirred for 2 hours at 0°–5°C and a solution of 16.192 g (0.16 mol) of triethylamine in 50 ml of dry DMA is then added dropwise. After stirring for one hour at 5°–10°C, the solution is cooled to −30°C and a solution of 8.4232 g (0.04 mol) of trimellitic acid 1,2-anhydride-chloride in 60 ml of 1,2-dichloroethane is added dropwise at this temperature. The reaction mixture is then kept at −20°C for 20 minutes, followed by 60 minutes at 5°–10°C, and finally a solution of 4.048 g (0.04 mol) of triethylamine in 50 ml of anhydrous DMA is added dropwise. After stirring the reaction mixture for a further hour, at 15°–20°C, the triethylamine hydrochloride is filtered off through a glass frit and carefully rinsed three times with DMA. A solution of 8.776 g (0.04 mol) of (γ-aminopropyl)di-n-propoxy-methylsilane in 50 ml of anhydrous DMA is introduced over the course of 10 minutes into the solution of the polyamide block with terminal anhydride groups (average molecular weight approx. 1,400) obtained above, at 15°-20°C. After stirring for 2 hours at room temperature (20°-25°C), a solution of a polyamide prepolymer with terminal methyl-di-n-propoxysilyl groups and an average molecular weight of approx. 1,850 is obtained; $\eta_{inh}$. 0.11 dl/g (0.5% in DMA at 25°C).

EXAMPLE 4

Analogously to Example 3, 21.628 g (0.2 mol) of m-phenylenediamine, 32.528 g (0.16 mol) of isophthalic acid dichloride and 32.4 g (0.32 mol) of triethylamine are first reacted with 16.830 g (0.08 mol) of trimellitic acid 1,2-anhydride-chloride to give a polyamide block with anhydride end groups and subsequently with 24.920 g (0.08 mol) of [γ-(4-aminophenoxy)-propyl]-di-n-propoxy-methylsilane to give a polyamide prepolymer with terminal methyl-di-n-propoxysilyl groups; average molecular weight approx. 2,000.

EXAMPLES 5 and 6

Polyamide prepolymers of the type described in Example 4, but with an average molecular weight of approx. 4,000 or approx. 6,000, respectively, are obtained analogously using the reagents listed below:

Polyamide prepolymer of average molecular weight approx. 4,000;

$\eta_{inh}$. 0.25 dl/g (0.5% in DMA at 25°C)

7.029 g (0.065 mol) of m-phenylenediamine, 12.198 g (0.06 mol) of isophthalic acid dichloride, 12.2 g (0.12 mol) of triethylamine, 2.106 g (0.01 mol) of trimellitic acid 1,2-anhydride-chloride, 1.01 g (0.01 mol) of triethylamine and 3.115 g (0.01 mol) of [γ-(4-aminophenoxy)-propyl]-di-n-propoxymethylsilane.

Polyamide prepolymer of average molecular weight approx. 6,000;

$\eta_{inh}$. 0.45 dl/g (0.5% in DMA at 25°C)

9.5163 g (0.088 mol) of m-phenylenediamine, 17.0772 g (0.084 mol) of isophthalic acid dichloride, 17.00 g (0.168 mol) of triethylamine, 1.6846 g (0.008 mol) of trimellitic acid 1,2-anhydride-chloride, 0.81 g (0.008 mol) of triethylamine and 2.492 g (0.008 mol) of [γ-(4-aminophenoxy)-propyl]-di-n-propoxymethylsilane.

EXAMPLE 7

26.5 g (0.082 mol) of finely powdered 3,3',4,4'-benzophenonetetracarboxylic acid dianhydried are suspended in 50 ml of anhydrous DMA under a nitrogen atmosphere in a 350 ml sulphonation flask which is equipped with a stirrer, dropping funnel and internal thermometer. A solution of 8.15 g (0.041 mol) of 4,4'-diaminodiphenylmethane in 34 ml of anhydrous DMA is added dropwise to the resulting suspension over the course of 30 minutes whilst stirring at 10°–15°C, and the reaction mixture is then stirred for 2 hours at room temperature (20°–25°C). The resulting solution is cooled to 0°–5°C; thereafter, 25.6 g (0.082 mol) of [γ-(4-aminophenoxy)-propyl]-di-n-proxy-methylsilane are added dropwise at this temperature over the course of 30 minutes. The solution is then stirred for one hour at room temperature. In this way, a 43% strength solution of a polyamide-acid prepolymer is obtained, which has a viscosity of 300 centipoise at room temperature and is outstandingly suitable for the manufacture of laminates by methods which are in themselves known. $\eta_{inh}$. of the prepolymer 0.083 dl/g (0.5% in DMA at 25°C).

EXAMPLE 8

Analogously to the procedure described in Example 7, 64.45 g (0.2 mol) of finely powdered 3,3',4,4'-benzophenonetetracarboxylic acid dianhydride are reacted with 20.03 g (0.1 mol) of 4,4'-diaminodiphenyl-ether and 62.30 g (0.2 mol) of [γ-(4-aminophenoxy)-propyl]-di-n-propoxy-methylsilane in 240 ml of anhydrous DMA. A 40% strength solution of a polyamide-acid prepolymer which has a viscosity of 400 centipoise at 23°C is obtained.

EXAMPLE 9

Following the procedure described in Example 7, 26.5 g (0.082 mol) of 3,3',4,4'-benzophenonetetracarboxylic acid dianhydride in 84 ml of anhydrous DMA are reacted with 8.15 g (0.041 mol) of 4,4'-diaminodiphenylmethane. The resulting solution of the polyamide-acid block possessing anhydride end groups is then treated with 18.0 g (0.082 mol) of (γ-aminopropyl)-di-n-propoxy-methylsilane at 0°–5°C and the mixture is stirred for one hour at room temperature. A 40% strength solution of a polyamide-acid prepolymer which has a viscosity of 300 centipoise at 25°C is obtained; $\eta_{inh}$. of the prepolymer 0.086 dl/g (0.5% in DMA at 25°C).

EXAMPLE 10

26.5 g (0.082 mol) of 3,3′,4,4′-benzophenonetetracarboxylic acid dianhydride in 130 ml of anhydrous tetrahydrofurane are heated under reflux in a nitrogen atmosphere in a 750 ml sulphonation flask equipped with a stirrer, dropping funnel and internal thermometer. A solution of 8.15 g (0.041 mol) of 4,4′-diaminodiphenylmethane in 72 ml of anhydrous tetrahydrofurane is added dropwise to the resulting suspension over the course of 30 minutes whilst stirring under reflux and the reaction mixture is then kept under reflux for a further hour. The resulting solution is cooled to 0°–5°C. At this temperature, 25.6 g (0.082 mol) of [γ-(4-aminophenoxy)-propyl]-di-n-propoxy-methylsilane are added dropwise over the course of 15 minutes and the mixture is stirred for a further hour at 0°–5°C. A 25% strength solution of a polyamide-acid prepolymer (average molecular weight approx. 1,500), which is suitable, for example, for laminating glass fibers, is obtained.

EXAMPLE 11

26.5 g (0.082 mol) of 3,3′,4,4′-benzophenonetetracarboxylic acid dianhydride in 40 g of anhydrous cyclohexanone are heated under reflux in a nitrogen atmosphere in a 350 ml sulphonation flask of the type described. A solution of 8.15 g (0.041 mol) of 4,4′-diaminodiphenylmethane in 39 g of anhydrous cyclohexanone is added dropwise to the resulting suspension over the course of 30 minutes whilst stirring under reflux. The resulting solution is stirred for a further hour at room temperature and is then cooled to 0°–5°C. At this temperature, 2.56 g (0.082 mol) of [γ-(4-aminophenoxy)-propyl]-di-n-propxy-methylsilane are added dropwise over the course of 15 minutes and the reaction mixture is stirred possessing a further half hour. A 40% strength solution of a polyamide-acid prepolymer having methyl-di-n-propoxysilyl end groups and possesing an average molecular weight of approx. 1,500 is obtained, which is suitable for impregnating glass fibre fabrics.

EXAMPLE 12

12.9 g (0.04 mol) of finely powdered 3,3′,4,4′-benzophenonetetracarboxylic acid dianhydride are suspended in 50 ml of anhydrous DMA under nitrogen in a 200 ml sulphonation flask which is equipped with a stirrer, dropping funnel and internal thermometer. The reaction mixture is cooled to 0°–5°C and 17.5 g (0.08 mol) of (γ-aminopropyl)-di-n-propoxy-methylsilane are then added dropwise, whilst stirring. After stirring the reaction mixture for one hour at room temperature, a clear solution of the prepolymer ($a = 0$) is produced; $\eta_{inh}$. of the prepolymer 0.044 dl/g (0.5% in DMA at 25°C).

EXAMPLE 13

8.12 g (0.04 mol) of isophthalic acid dichloride are dissolved in 60 ml of anhydrous DMA at −15°C under nitrogen in a 200 ml sulphonation flask equipped with a stirrer, dropping funnel and internal thermometer. A solution of 17.5 g (0.08 mol) of (γ-aminopropyl)-di-n-propoxy-methylsilane and 8.08 g (0.08 mol) of triethylamine in 40 ml of anhydrous DMA is added dropwise thereto at a temperature of −10°C to −15°C, whilst stirring. The reaction mixture is then stirred for 2 hours at 0°C to 5°C and then for a further 2 hours at room temperature (20°–25°C). After filtering off the triethylamine hydrochloride, which has precipitated, on a glass frit, a solution of the prepolymer ($a = 0$) [$\eta_{inh}$. 0.04 dl/g; 0.5% in DMA at 25°C] is obtained which is suitable, for example, for the manufacture of laminates.

EXAMPLES 14–17

A solution of 10.01 g (0.05 mol) of 4,4′-diaminodiphenylether (II) in 60 ml of anhydrous DMA is added dropwise over the course of 15 minutes to a solution of 13.08 g (0.06 mol) of pyromellitic acid dianhydride (PMDA; I) in 40 ml of anhydrous DMA under nitrogen at between 20° and 30°C in an apparatus of the type described in Example 7, and after completion of the addition the mixture is further stirred at room temperature for about 1 hour. A solution of 6.4 g (0.022 mol) of (γ-aminopropyl)-di-n-propoxy-methylsilane (III) in 10 ml of DMA is then added dropwise at room temperature and the reaction mixture is stirred for a further hour. A clear, yellow-coloured, approx. 25% strength solution of a polyamide-acid prepolymer of the above formula having two silicon-functional end groups and an average value of $a = 5$ is thus obtained, the solution having a viscosity of approx. 60 centipoise at 20°C; $\eta_{inh}$. of the prepolymer 0.21 dl/g (0.5% in DMA at 25°C).

The prepolymer solutions listed in the table below are prepared analogously using reactants I, II and III.

| Example No. | PMDA I g | PMDA I mol | II g | II mol | III g | III mol | Viscosity of the solution, centipoise | a=(average) | $\eta_{inh}$. (0.5% in DMA |
|---|---|---|---|---|---|---|---|---|---|
| 15 | 11.99 | 0.055 | 10.01 | 0.05 | 2.19 | 0.01 | approx. 200 | 10 | 0.38 dl/g |
| 16 | 11.45 | 0.052 | 10.01 | 0.05 | 1.45 | 0.005 | approx. 1,800 | 25 | 0.60 dl/g |
| 17 | 11.27 | 0.0516 | 10.01 | 0.05 | 0.98 | 0.0034 | approx. 2,500 | 30 | 0.73 dl/g |

The clear, yellow-coloured prepolymer solutions obtained according to Examples 14–17 can be used, in a manner which is in itself known, for the manufacture of, for example, films, coatings, laminates, compression moulding powders or fibres.

EXAMPLE 18

32.22 g (0.1 mol) of finely powdered 3,3′,4,4′-benzophenonetetracarboxylic acid dianhydride are dissolved in 120 ml of anhydrous DMA under nitrogen in an apparatus of the type described in Example 1. A solution of 9.91 g (0.05 mol) of 4,4′-diaminodiphenylmethane in 80 ml of DMA is added dropwise at 10°–15°C in such a way that the temperature of the reaction solution does not exceed 15°C. The reaction solution is then stirred for 2 hours at approx. 25°C. The solution is then cooled to 0°–5°C and at this temperature a solution of 31.15 g (0.1 mol) of [γ-(4-aminophenoxy)-propyl]-di-n-propoxy-methylsilane in 35 ml of anhydrous DMA is added dropwise. Finally, the reaction solution is stirred for a further hour at approx. 25°C.

A mixture of 90 ml of acetic anhydride and 60 ml of pyridine is added dropwise to this solution whilst stirring and the mixture is stirred for a further 16 hours. A voluminous precipitate forms. The reaction mixture is poured into a large excess of water whilst stirring vigorously and the product which has precipitated is filtered off, washed with water and dried for 24 hours at 50°C/100 mm Hg and for 24 hours at 50°C/$10^{-1}$ mm Hg. After grinding in a ball mill, the imidised (cyclised) prepolymer is obtained as a fine yellow powder.

EXAMPLE 19

Analogously to the procedure described in Example 7, 25.78 g (0.08 mol) of finely powdered 3,3',4,4'-benzophenonetetracarboxylic acid dianhydride are reacted with 4.33 g (0.04 mol) of p-phenylenediamine and 17.55 g (0.08 mol) of (γ-aminopropyl)-di-n-propoxymethylsilane in 120 ml of anhydrous DMA. A 30% strength solution of a polyamide-acid prepolymer having a viscosity of approx. 200 centipoise at 25°C is obtained; $\eta_{inh.}$ of the prepolymer 0.081 dl/g (0.5% in DMA at 25°C).

EXAMPLE 20

Analogously to the procedure described in Example 7, 25.78 (0.08 mol) of 3,3',4,4'-benzophenonetetracarboxylic acid dianhydride, 7.94 g (0.04 mol) of 4,4'-diaminodiphenylmethane and 17.70 g (0.08 mol) of (γ-aminopropyl)-triethoxysilane are reacted in 82 ml of anhydrous DMA. A 40% strength solution of a polyamide-acid prepolymer is obtained; $\eta_{inh.}$ of the prepolymer 0.08 dl/g (0.5% in DMA at 25°C).

EXAMPLE 21

Analogously to the procedure described in Example 7, 17.45 g (0.08 mol) of pyromellitic acid dianhydride, 7.94 g (0.04 mol) of 4,4'-diaminodiphenyl-ether and 17.54 (0.08 mol) of (γ-aminopropyl)-di-n-propoxymethylsilane are reacted in 79 ml of anhydrous DMA. A 31% strength solution of a polyamideacid prepolymer which is suitable for the manufacture of laminates is obtained; $\eta_{inh.}$ of the prepolymer 0.09 dl/g (0.5% in DMA at 25°C).

EXAMPLE 22

12.63 g (0.06 mol) of trimellitic acid 1,2-anhydride-chloride are dissolved in 60 ml of anhydrous DMA at −15°C under nitrogen in an apparatus of the type described in Example 7. A solution of 26.32 g (0.12 mol) of (γ-aminopropyl)-di-n-propoxy-methylsilane and 6.07 g (0.06 mol) of triethylamine in 37 ml of anhydrous DMA is added dropwise to this solution, whilst stirring, in such a way that the reaction temperature does not exceed −15°C. After completion of the addition, the reaction mixture is stirred for 1 hour at 0°C and then for 1 hour at room temperature (20°-25°C), after which the triethylamine hydrochloride which has precipitated is filtered off. A clear 30% strength solution of a prepolymer which is suitable, for example, for the manufacture of laminates, is obtained.

EXAMPLE 23

5.28 g (0.0275 mol) of trimellitic acid anhydride and 10.91 g (0.055 mol) of 4,4'-diaminodiphenylmethane in 70 ml of N-methylpyrrolidone are heated for 4 hours to 185°C under nitrogen, whilst stirring. After cooling, the resulting solution is added dropwise to 17.73 g (0.055 mol) of 3,3',4,4'-benzophenonetetracarboxylic acid dianhydride in 50 ml of N-methylpyrrolidone at 0°C under nitrogen, whilst stirring. The reaction mixture is then stirred for 1 hour at room temperature and cooled to 0°-5°C, and a solution of 12.07 g (0.055 mol) of (γ-aminopropyl)-di-n-propoxy-methylsilane in 10 ml of N-methylpyrrolidone is added dropwise. The reaction mixture is then stirred for a further hour at room temperature. A 30% strength solution of a prepolymer which is suitable for the manufacture of laminates by methods which are in themselves known is obtained.

EXAMPLE 24

A. Preparation of a polyamide block with amino end groups 2.812 g (0.026 mol) of m-phenylenediamine are dissolved in 50 ml of anhydrous DMA under nitrogen in a 500 ml sulphonation flask equipped with a stirrer, internal thermometer, dropping funnel and a nitrogen inlet tube. 4.872 g (0.024 mol) of isophthalic acid dichloride in solid form are added in portions to the resulting solution, whilst cooling to −15°C to −5°C, and the reaction mixture is kept for one hour at −5°C and then for 3 hours at 20°-25°C. A solution of 4.84 g (0.048 mol) of a triethylamine in 30 ml of anhydrous DMA is then added dropwise at 5-10°C to neutralise the hydrogen chloride produced. After stirring for one hour at room temperature, the triethylamine hydrochloride which has precipitated is filtered off under nitrogen and the reaction product is washed carefully three times with a little anhydrous DMA.

B. Preparation of a polyamide-acid block with anhydride end groups.

9.02 g (0.028 mol) of 3,3',4,4'-benzophenonetetracarboxylic acid dianhydride are suspended in 65 ml of anhydrous DMA under nitrogen in an apparatus of the type described above. A solution of 4.806 g (0.024 mol) of 4,4'-diaminodiphenyl-ether in 50 ml of anhydrous DMA is then added dropwise at 5°-20°C. The reaction mixture is then stirred for 1 hour at 20°-25°C.

C. Preparation of a polyamide-polyamide-acid prepolymer

The solution obtained according to A) is added dropwise to the solution obtained according to B) under nitrogen at 5°-10°C. Thereafter, the reaction mixture is stirred for 1 hour at 20°-25°C and is then cooled to 0°-5°C, and a solution of 0.878 g (0.004 mol) of (γ-aminopropyl)-di-n-propoxy-methylsilane is added dropwise. The resulting reaction solution is stirred for a further hour at 20°-25°C. A solution of a polyamide-polyamide-acid block copolymer is obtained which is suitable, for example, for the manufacture of films.

EXAMPLE 25

A. Preparation of a polyamide block with amino end groups

Analogously to the procedure described in Example 24 under A), 14.059 g (0.130 mol) of m-phenylenediamine, 24,364 g (0.12 mol) of isophthalic acid dichloride and 24.288 g (0.24 mol) of triethylamine are reacted in 178 ml of anhydrous DMA to give a polyamide block with amino end groups.

B. Preparation of the prepolymer

The solution obtained according to A) is added dropwise to a solution of 4.834 g (0.015 mol) of 3,3',4,4'-benzophenonetetracarboxylic acid dianhydride in 163 ml of anhydrous DMA at 0°C under nitrogen, whilst stirring. Thereafter, the resulting reaction solution is stirred for 1 hour at 20°–25°C and then cooled to 0°–5°C, and a solution of 2.194 g (0.01 mol) of (γ-aminopropyl)-di-n-propoxy-methylsilane in 10 ml of anhydrous DMA is added. After stirring for a further hour at 20°–25°C, a prepolymer solution is obtained which is suitable, for example, for the manufacture of films and the production of coatings.

This solution can be converted into a powder of the corresponding imidised prepolymer in the manner described in Example 18, paragraph 2, using a mixture of 120 ml of acetic anhydride and 80 ml of pyridine.

EXAMPLE 26

4.34 g (0.0218 mol) of 4,4'-diaminodiphenylmethane and 1.66 g (0.0164 mol) of triethylamine are dissolved in 50 ml of anhydrous DMA under nitrogen in an apparatus of the type described in Example 7, and the solution is cooled to −15°C. 3.46 g (0.0164 mol) of trimellittic acid 1,2-anydride-chloride in powder form are added in portions to this solution in such a way that the reaction temperature does not exceed −15°C. The reaction mixture is then stirred for 1 hour at −15°C and for a further hour at 20°–25°C. The resulting solution is added dropwise to a solution of 2.2 g (0.0068 mol) of 3,3',4,4'-benzophenonetetracarboxylic acid dianhydride in 40 ml of anhydrous DMA at 0°C, whilst stirring. The reaction solution is stirred for a further hour at 20°–25°C and then cooled to 0°–5°C, and a solution of 0.6 g (0.0027 mol) of (γ-aminopropyl)-di-n-propoxy-methylsilane in 10 ml of DMA is added. The reaction solution is stirred for a further hour at 20°–25°C and the triethylamine hydrochloride which has precipitated is then filtered off. A solution of a prepolymer with a block-like arrangement of the polyamide-amide-acid units is obtained, which is suitable for the production of coatings and films.

EXAMPLE 27

A. Preparation of a poplyamide block with amino end groups

Analogously to the procedure described in Example 24 under A), 14.059 g (0.13 mol) of m-phenylenediamine, 24.364 g (0.12 mol) of isophthalic acid dichloride and 24.288 g (0.24 mol) of triethylamine are reacted in 176 ml of anhydrous DMA to give a polyamide block with amino end groups.

B. Preparation of the prepolymer

To the solution obtained according to A) are added, whilst stirring and under nitrogen, at −15°C, first 0.404 g (0.004 mol) of triethylamine in 5 ml of DMA and then, in portions, a mixture of 1.289 g (0.004 mol) of pulverulent 3,3',4,4'-benzophenonetetracarboxylic acid dianhydride and 0.842 g (0.004 mol) of pulverulent trimellitic acid 1,2-anhydride-chloride. In the course thereof, the reaction temperature should not exceed −15°C. After completion of the addition, the reaction mixture is stirred first for 1 hour at −15°C and then for a further hour at 0°C and thereafter a solution of 1.878 g (0.004 mol) of trimellitic acid 1,2-anhydride 4'-[γ-(di-n-propoxy-methylsilyl)-propyl]-anilide in 39 ml of anhydrous DMA is added dropwise. The reaction mixture is then stirred for a further 2 hours at 20°–25°C and is freed by filtration from the triethylamine hydrochloride which has precipitated. A solution of a polyamide-polyamide-acid prepolymer with a statistical distribution of the amide-acid units is obtained, which is suitable, for example, for the productiono of films and coatings by methods which are in themselves known.

The above prepolymer solution can be converted to a powder of the corresponding imidised prepolymer in the manner described in Example 18, paragraph 2, using a mixture of 60 ml of acetic anhydride and 40 ml of pyridine.

EXAMPLE 28

5.26 g (0.025 mol) of trimellitic acid 1,2-anhydride-chloride are dissolved in 35 ml of anhydrous DMA at −15°C to −20°C under nitrogen in an apparatus of the type described in Example 7. A solution of 2.48 g (0.0125 mol) of 4,4'-diaminodiphenylmethane and 2.53 g (0.025 mol) of triethylamine in 15 ml of anhydrous DMA is added dropwise to the solution obtained, whilst cooling and stirring constantly, in such a way that the temperature in the reaction vessel does not exceed −15°C. After completion of the addition, the mixture is stirred for a further 15 minutes at the same temperature and a solution of 5.38 g (0.025 mol) of (γ-aminopropyl)-di-n-propoxymethylsilane in 6 ml of anhydrous DMA is then added dropwise. Thereafter, the reaction mixture is stirred for 2 hours at 20°–25°C and the triethylamine hydrochloride which has precipitated is removed by filtration.

A mixture of 45 ml of acetic anhydride and 30 ml of pyridine is then added dropwise to the filtered solution, whilst stirring, and the whole is stirred for a further 16 hours at room temperature. A fine precipitate forms. The reaction mixture is poured into a large excess of water whilst stirring vigorously and the product which has precipitated is filtered off, repeatedly rinsed with water and dried for 20 hours at 50°/100 mm Hg and for 20 hours at 50°C/$10^{-1}$ mm Hg. After pulverising in a mortar, the imidised prepolymer is obtained as a fine yellowish powder.

EXAMPLE 29

Analogously to the procedure described in Example 28, paragraph 1, 6.74 g (0.032 mol) of trimellitic acid 1,2-anhydride-chloride, 5.95 g (0.030 mol) of 4,4'-diaminodiphenylmethane, 3.24 g (0.032 mol) of triethylamine and 0.88 g (0.004 mol) of (γ-aminopropyl)-di-n-propoxy-methylsilane are reacted in 141 ml of anhydrous DMA. After filtering off the triethylamine hydrochloride, a clear solution of a polyamide-amide-acid prepolymer is obtained, which is above all suitable for the production of films and coatings.

EXAMPLE 30

Analogously to the procedure described in Example 28, paragraph 1, 2.316 g (0.011 mol) of trimellitic acid 1,2-anhydride-chloride, 3.544 g (0.011 mol) of 3,3',4-,4'-benzophenonetetracarboxylic acid dianhydride, 3.965 g (0.020 mol) of 4,4'-diaminodiphenylmethane, 2.226 g (0.022 mol) of triethylamine and 0.877 g (0.004 mol) of (γ-aminopropyl)-di-n-propoxymethylsilane are reacted in 102 ml of anhydrous DMA. After filtering off the triethylamine hydrochloride, a clear solution of a polyamide-amide-acid prepolymer with a statistical distribution of the polyamide-amide-acid and polyamide-acid units is obtained. The solution is particularly suitable for the production of films and coatings.

EXAMPLE 31

8.06 g (0.025 mol) of 3,3′,4,4′-benzophenonetetracarboxylic acid dianhydride and 5.26 g (0.025 mol) of trimellitic acid 1,2-anhydride-chloride are initially introduced into 45 ml of anhydrous DMA at −15°C under nitrogen in an apparatus of the type described in Example 7. A solution of 4.96 g (0.025 mol) of 4,4′-diaminodiphenylmethane and 2.53 g (0.025 mol) of triethylamine in 15 ml of anhydrous DMA is added dropwise thereto, whilst stirring, in such a way that the reaction temperature does not exceed −15°C. After completion of the addition and after stirring the reaction mixture for 2 hours at this temperature, a solution of 10.76 g (0.05 mol) of (γ-aminopropyl)-di-n-propoxy-methylsilane in 12 ml of anhydrous DMA is added dropwise. The reaction mixture is then stirred for 2 hours at 20°–25°C and the triethylamine hydrochloride which has precipitated is filtered off. A 30% strength solution of a polyamide-amide-acid prepolymer is obtained which is suitable, for example, for laminating glass fibres.

EXAMPLE 32

Analogously to Example 31, 8.06 g (0.025 mol) of 3,3′,4,4′-benzophenonetetracarboxylic acid dianhydride, 5.26 g (0.025 mol) of trimellitic acid 1,2-anhydride-chloride, 4.96 g (0.025 mol) of 4,4′-diaminodiphenylmethane, 2.53 g (0.025 mol) of triethylamine and 10.76 g (0.05 mol) of (γ-aminopropyl)-di-n-propoxy-methylsilane are reacted in 82 ml of anhydrous DMA. After filtering off the triethylamine hydrochloride, a mixture of 90 ml of acetic anhydride and 60 ml of pyridine is added dropwise to the reaction solution, whilst stirring, and the whole is stirred for 16 hours at 20°–25°C. A precipitate forms. The reaction mixture is then poured into a large excess of water, with vigorous stirring, and the product which has precipitated is filtered off, repeatedly washed with water and dried for 20 hours at 50°C/100 mm Hg and for 20 hours at 50°C/10⁻¹ mm Hg. After pulverising, the imidised prepolymer is obtained as a fine yellowish powder.

EXAMPLE 33

Analogously to Example 31, 9.159 g (0.0435 mol) of trimellitic acid 1,2-anhydride-chloride, 9.48 g (0.0435 mol) of pyromellitic acid dianhydride, 8.71 g (0.0435 mol) of 4,4′-diaminodiphenyl-ether, 4.40 g (0.0435 mol) of triethylamine and 19.26 g (0.087 mol) of (γ-aminopropyl)-triethoxysilane are reacted in 130 ml of anhydrous DMA. A solution of a polyamide-amide-acid propolymer is obtained, which is suitable, for example, for laminating glass fibres.

EXAMPLE 34

Following the procedure described in Example 1, 30.5 g (0.15 mol) of isophthalic acid dichloride, 10.81 g (0.1 mol) of m-phenylenediamine, 30.4 g (0.3 mol) of triethylamine and 21.94 g (0.1 mol) of (γ-aminopropyl)-di-n-propoxy-methylsilane are reacted in 606 ml of anhydrous DMA. After filtering off the triethylamine hydrochloride formed, the solution is poured into a large excess of water, with vigorous stirring. A fine white precipitate separates out, which is filtered off and dried for 16 hours at 50°/10⁻¹ mm Hg. After grinding in a mortar, a polyamide prepolymer is obtained in the form of a fine white powder.

EXAMPLE 35

The powder obtained according to Example 34 is heated to 200°C in a closed mould for 10 minutes in order to foam it. A white, hard foam of uniform pore size is obtained.

EXAMPLE 36

The powder of the polyimide prepolymer obtained according to Example 18 is introduced into a compression mould for circular discs which is heated to 300°C, and the powder is heated for 3 minutes under contact pressure, after repeated venting. The pressure is then raised stepwise to 325 kp/cm² and this pressure is maintained at 300°C for 1 hour. After release from the mould at 220°C, transparent discs of good flexural strength and good electrical properties are obtained.

The powders obtained according to Examples 28 and 32 are pressed analogously, the pressure being raised up to 900 kp 2, to give discs which are distinguished by good flexibility.

EXAMPLE 37

Glass fibre fabric (for example E-glass with an aminosilane finish) is impregnated with the solution of a polyamide-acid prepolymer, prepared according to Example 7, by drawing the fabric once through the polymer solution. The impregnated fabric is dried for one hour at 50°C/200 mm Hg and for one hour at 50°/10⁻¹ mm Hg. Several of the prepregs thus obtained are stacked on top of one another and pressed in a platen press at 165°C to give laminates, the pressing being carried out for 5 minutes under contact pressure and for 7 hours under a pressure of 500 kp/cm². During the first hour, the pressure is released periodically to facilitate the removal of volatile products. Thereafter, the laminates are post-cured for 16 hours at 160°–200°C/20 mm Hg. After complete curing, the resin content of the laminates is 20% by weight (determined by ashing).

Well-bonded, bubble-free laminates of good heat stability and excellent mechanical and electrical properties are obtained.

Laminates with similar properties can be produced by analogously processing the prepolymer solutions obtained according to Examples 8, 9 and 19–21.

EXAMPLE 38

Glass fibre fabric is impregnated by dipping it into the prepolymer solution obtained according to Example 13. The impregnated fabric is then briefly dried in a vacuum drying cabinet at 50°C/300 mm Hg. This operation is repeated 7 times more so as to apply sufficient resin to the fabric. The fabric is then dried for 1 hour at 50°C/300 mm Hg and for 1 hour at 50°C/10⁻² mm Hg. Several of the dried prepregs obtained in this way are stacked on top of one another and pressed in a platen press at 165°C under a pressure of 400 kp/cm² for 7 hours and are then post-cured for 16 hours at 200°C/10⁻¹ mm Hg. A laminate of good bond strength is obtained.

The prepolymer solutions obtained according to Examples 1, 22, 23, 31 and 33 can be processed analogously to give laminates with similar properties.

EXAMPLE 39

Glass fibre fabric is impregnated in the manner described in Example 37 with the propolymer solution prepared according to Example 10, but the fabric is only dried for 1 hour at 50°C/200 mm Hg. The prepregs thus obtained are pressed to give laminates in the manner indicated in the said example 37. Firmly bonded, bubble-free laminates of 19% by weight resin content are obtained. The laminates exhibit good mechanical and thermal properties.

EXAMPLE 40

The solution of a polyamide-acid prepolymer prepared according to Example 11 is converted, in the manner described in the preceding example, into a glass fibre laminate. Firmly bonded, bubble-free laminates of good flexural strength and heat stability are obtained.

EXAMPLE 41

The prepolymer solution obtained according to Example 1 is completely evaporated to dryness in vacuo at 60°C. The resulting dry compression-moulding powder is pressed by the compression-moulding process at 165°C under a pressure of 200 kp/cm², to give sheets. The sheets are post-cured by warming them to 200°C/10⁻¹ mm Hg for 16 hours. Transparent sheets are obtained.

EXAMPLE 42

A 25% strength solution of the polyamide-acid prepolymer prepared according to Example 9 is completely evaporated to dryness in vacuo at 50°C. The resulting powder is pressed by the compression-moulding process at 175°C under a pressure of 500 kp/cm², to give standard bars. The compression mouldings are post-cured by heating them to 225°C/10⁻¹ mm Hg for 16 hours. Bars of good heat stability and excellent mechanical properties even at low temperatures are obtained.

What we claim is:

1. A silicon-modified polyamide, polyamide-acid or polyamide-amide-acid monomer or prepolymer with an inherent viscosity of 0.04 to 4.0, which have the formula I

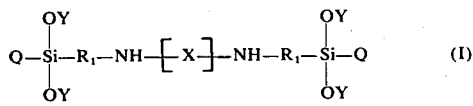

wherein X represents a structural element of the formula II

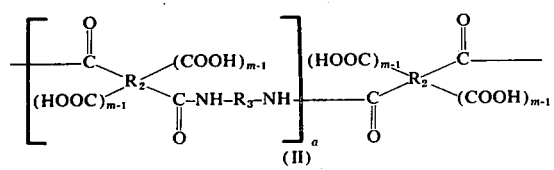

$a$ denotes a number from 0 to 100, and the individual $m$, $R_1$, $R_2$, $R_3$, Q and Y independently of one another denote the following: $m$ denotes the number 1 or 2, $R_1$ denotes a radical

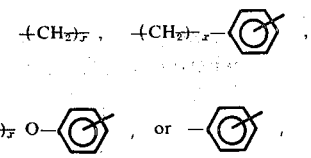

with $x$ denoting a number from 1 to 4, $R_2$ denotes a carbocyclic-aromatic or heterocyclic radical, wherein the carbonamide and carboxyl groups are bonded to different ring carbon atoms and the carboxyl groups are each in the ortho-position to a carbonamide group, $R_3$ denotes an aliphatic radical with at least 2 carbon atoms, or a cycloaliphatic, araliphatic, carbocyclic-aromatic or heterocyclic radical, Q denotes methyl, phenyl or a —OY radical, with Y having the meaning indicated below, and Y denotes an alkyl radical with 1 to 6 carbon atoms or a phenyl radical, and the corresponding cyclised derivatives.

2. A silicon-modified monomer or prepolymer of the formula I according to claim 1, wherein the individual $R_2$ independently of one another represent an unsubstituted monocyclic, fused polycyclic or non-fused bicyclic aromatic radical, the aromatic nucleii, in the latter case, being bonded to one another via the bridge member —O— or —CO—, the individual $R_3$ independently of one another represent a monocyclic or non-fused bicyclic aromatic radical which is optionally substituted by halogen atoms or alkyl or alkoxy groups with 1–4 carbon atoms each, an unsubstituted monocyclic araliphatic radical or an unsubstituted aliphatic radical with 2–10 carbon atoms, and what has been stated in claim 1 applies to $a$, $m$, $R_1$, Q and Y, and the corresponding cyclised derivatives.

3. A silicon-modified monomer or prepolymer of the formula I according to claim 1, wherein $R_2$ represents the 1,4- or 1,3-phenylene radical, a benzene ring or the benzophenone ring system and $R_3$ represents the 1,4- or 1,3-phenylene radical, the 4,4'-diphenylyl-ether radical or 4,4'-diphenylylmethane radical, with only one of $R_2$ and $R_3$ denoting a 1,4-phenylene radical, and what has been stated in claim 1 applies to $a$, $m$, $R_1$, Q and Y, and the corresponding cyclised derivatives.

4. A silicon-modified prepolymer of the formula I according to claim 1, wherein, if $a \geq 1$, the individual $R_2$ and $R_3$ have the same meaning, $m$ is the same for each radical $R_2$, and what has been stated in claim 1 applies to $R_1$, Q and Y, and the corresponding cyclised derivatives.

5. A silicon-modified prepolymer of the formula I according to claim 1, wherein X represents a structural element of the formula IIb

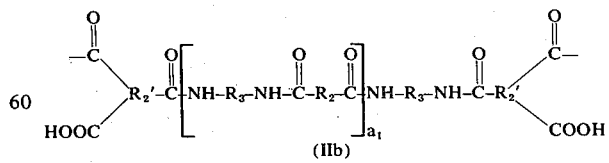

in which $a_1$ denotes a number from 1 to 99 and the two $R_2'$ each represent a benzene ring, with the carbonamide and carboxyl groups being bonded to different ring carbon atoms and the carboxyl groups each being in the ortho-position to the —CO-NH-$R_1$— grouping, and the individual $R_1$, $R_2$, $R_3$, Q and Y are identical, and the corresponding derivatives with cyclised terminal carboxylic acid groups.

6. A silicon-modified prepolymer of the formula I according to claim 1, wherein X represents a structural element of the formula IIc

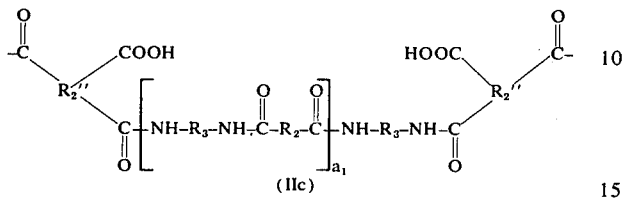

(IIc)

in which $a_1$ denotes a number from 1 to 99 and the two $R_2''$ each denote a benzene ring, with the carbonamide groups and carboxyl groups being bonded to different ring carbon atoms and the carboxyl groups being each in the ortho-position to the —CO-NH-$R_3$— grouping, and the individual $R_1$, $R_2$, $R_3$, Q and Y are identical, as well as the corresponding derivatives with cyclised terminal carboxylic acid groups.

7. A silicon-modified prepolymer of the formula I according to claim 5, wherein $R_1$ in each case denotes a

radical, the individual $R_2$ and $R_3$ are identical and one of $R_2$ and $R_3$ represents the 1,4-phenylene radical and the other the 1,3-phenylene radical or $R_2$ and $R_3$ each represent the 1,3-phenylene radical, Q represents the methyl group and Y represents a propyl group or Q represents the ethoxy group and Y represents the ethyl group and what has been stated under claim 5 applies to $a_1$ and $R_2'$, as well as the corresponding derivatives with cyclised terminal carboxylic acid groups.

8. A silicon-modified monomer or prepolymer of the formula I according to claim 1, wherein m in each case denotes the number 1, $R_1$ in each case represents a

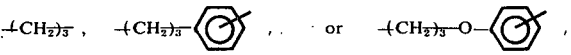

radical, the individual $R_2$ and $R_3$ are identical and one of $R_2$ and $R_3$ represents the 1,4-phenylene radical and the other the 1,3-phenylene radical or $R_2$ and $R_3$ each represent the 1,3-phenylene radical, Q represents the methyl group and Y represents a propyl group or Q represents the ethoxy group and Y represents the ethyl group and what has been stated in claim 1 applies to $a$.

9. A silicon-modified monomer or prepolymer of the formula I according to claim 1, wherein $m$ in each case denotes the number 2, $R_1$ in each case represents a

radical, $R_2$ in each case denotes a benzene ring or the benzophenone ring system, $R_3$ in each case denotes the 4,4'-diphenylyl-ether or the 4,4'-diphenylylmethane radical, Q denotes the methyl group and Y denotes a propyl group or Q denotes the ethoxy group and Y denotes the ethyl group and what has been stated in claim 1 applies to $a$, as well as the corresponding cyclised derivatives.

10. A silicon-modified monomer or prepolymer of the formula I according to claim 1, wherein X represents a structural element of the formula IId

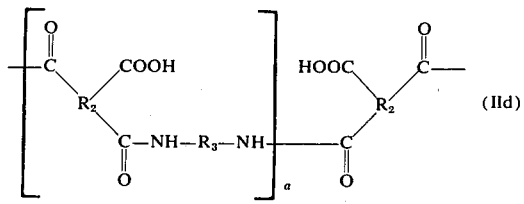

(IId)

in which $R_1$ in each case represents a

radical, $R_2$ in each case denotes a benzene ring and $R_3$ in each case denotes the 4,4'-diphenylyl-ether or the 4,4'-diphenylylmethane radical, Q denotes the methyl group and Y denotes a propyl group or Q denotes the ethoxy group and Y denotes the ethyl group, and what has been stated in claim 1 applies to $a$, as well the corresponding cyclised derivatives.

11. Silicon-modified prepolymers of the formula I according to claim 6, wherein $R_1$ in each case represents a

radical, the individual $R_2$ and $R_3$ are respectively identical and one of $R_2$ and $R_3$ denotes the 1,4-phenylene radical and the other the 1,3-phenylene radical, or $R_2$ and $R_3$ each denote the 1,3-phenylene radical, Q denotes the methyl group and Y denotes a propyl group or Q denotes the ethoxy group and Y denotes the ethyl group and what has been stated in claim 6 applies to $a_1$ and $R_2''$, as well as the corresponding derivatives with cyclised terminal carboxylic acid groups.

12. A process for the manufacture of a silicon-modified polyamide, polyamide-acid or polyamide-amide-acid monomer or prepolymer with an inherent viscosity of 0.04 to 4.0, which has the formula I

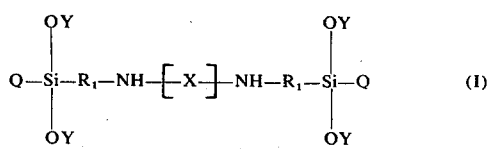

(I)

wherein X represents a structural element of the formula II

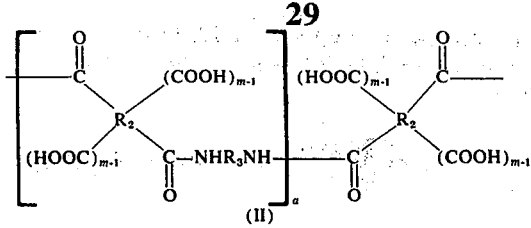

$a$ denotes a number from 0 to 100, and the individual $m$, $R_1$, $R_2$, $R_3$, Q and Y independently of one another denote the following: $m$ denotes the number 1 or 2, $R_1$ denotes a radical $-(CH_2)_x-$

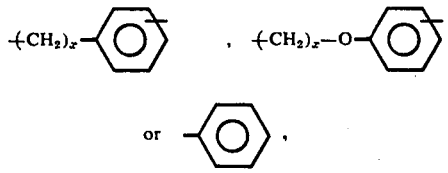

with $x$ denoting a number from 1 to 4, $R_2$ denotes a carbocyclic-aromatic or heterocyclic radical, wherein the carbonamide and carboxyl groups are bonded to different ring carbon atoms and the carboxyl groups are each in the ortho-position to a carbonamide group, $R_3$ denotes an aliphatic radical with at least 2 carbon atoms, or a cycloaliphatic, araliphatic, carbocyclic-aromatic or heterocyclic radical, Q denotes methyl, phenyl or a —OY radical, with Y having the meaning indicated below, and Y denotes an alkyl radical with 1 to 6 carbon atoms or a phenyl radical, and the corresponding cyclised derivative, characterised in that, if $a$ = o, one mole of a dicarboxylic acid dichloride of the formula

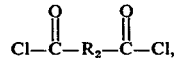

a tricarboxylic acid anhydride-chloride of the formula

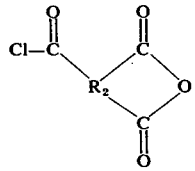

or a tetracarboxylic acid dianhydride of the formula

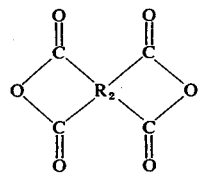

or, if $a \geq 1$, one mole of a polyamide or a polyamide-amide-acid with two acid chloride end groups, a polyamide-acid or a polyamide-amide-acid with two anhydride end groups or a polyamide-amide-acid with one acid chloride end group and one anhydride end group, all these, apart from said end groups, corresponding to the formula II, or corresponding cyclised derivative is reacted with two moles, a stoichiometric amount, of an aminosilane of the formula III

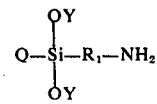

at a temperature between −20°C and + 50°C in an anhydrous aprotic organic solvent wherein what has been stated under formula I applies to $a$, $m$, $R_1$, $R_2$, $R_3$, Q and Y, and the silicon-modified polyamide-acid or polyamide-amide-acid monomer or prepolymer is optionally subsequently cyclised chemically.

13. A process according to claim 12 for the manufacture of a silicon-modified polyamide, polyamide-acid and polyamide-amide-acid monomer or prepolymer of the formula I, wherein X represents a structural element of the formula IIa

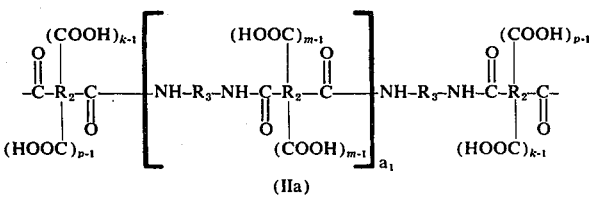

$a_1$ denotes a number from 0 to 99, $k$ denotes the number 2 and $p$ denotes the number 1 or 2 and what has been stated in claim 12 applies to $m$, $R_1$, $R_2$, $R_3$, Q and Y, and of the corresponding cyclised derivative, characterised in that two moles, a stoichiometric amount, of a compound of the formula IV

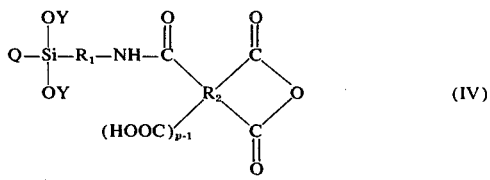

wherein $p$ is the number 1 or 2, the radical —COOH is in the ortho-position to the grouping —CO-NH-$R_1$ and the anhydride grouping is bonded to adjacent C atoms of the radical $R_2$, is reacted, if $a_1 = 0$, with one mole of a diamine of the formula $H_2N$-$R_3$-$NH_2$, or, if $a_1 \geq 1$, with one mole of a polyamide, a polyamide-acid or a polyamide-amide-acid of the formula V

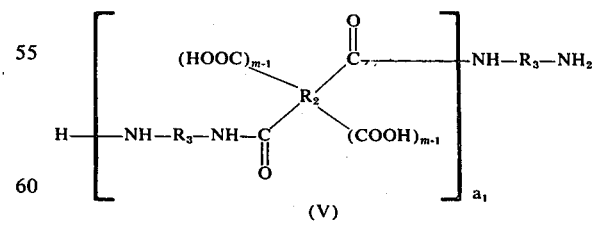

or the corresponding cyclised derivative, in which formulae what has been stated under formula IIa or in claim 12 applies to $a_1$, $m$, $p$, $R_1$, $R_2$, $R_3$, Q and Y, and the silicon-modified polyamide-acid or polyamide-amide-acid monomer or prepolymer is optionally subsequently cyclised chemically.

14. Process according to claim 12, characterised in that an aminosilane of the formula III is used, wherein $R_1$ denotes

radical, Q denotes the methyl group and Y denotes a propyl group or Q denotes the ethoxy group and Y denotes the ethyl group.

15. Process according to claim 13, characterised in that a compound of the formula IV is used, wherein $R_1$ denotes a

radical, $R_2$ denotes a benzene ring, $p$ denotes the number 1, Q denotes the methyl group and Y denotes a propyl group or Q denotes the ethoxy group and Y denotes the ethyl group.

* * * * *